United States Patent Office 3,592,781
Patented July 13, 1971

3,592,781

CONDUCTIVE GLAZE COMPOSITION AND METHOD FOR PREPARATION

Gerald P. Wirtz, Urbana, Ill., and Robert M. King, Lewiston, N.Y., assignors to Air Reduction Company, Incorporated, New York, N.Y.

No Drawing. Filed Feb. 18, 1969, Ser. No. 800,276
Int. Cl. H01b *1/02;* B44b *1/02*
U.S. Cl. 252—514 7 Claims

ABSTRACT OF THE DISCLOSURE

An electroconductive glaze composition comprising a homogeneous mixture of approximately 85 to 95% by weight particulate metals, dispersed in an at least partially devitrified glass matrix, said metals preferably comprising approximately 5 to 20% by weight cadmium, and balance silver.

BACKGROUND OF THE INVENTION

This invention relates generally to compositions of the type suitable for formation into electroconductive glazes and, more specifically, to compositions of this type which are suitable for production of glazes displaying relatively high electrical conductivity.

During recent years, a series of disclosures have been reported directed toward a class of materials frequently referred to as electroconductive glazes. These ceramic-like materials typically are formed from paste-like dispersions of metals, conductive oxides, semiconductors, etc., in glass frit matrices including miscellaneous added inert materials and/or temporary binders. Essentially resistive compositions of this type, for example, are disclosed, among other places, in U.S. Pats. Nos. 3,052,573, 3,154,503, and 3,329,526. All of the foregoing compositions are characterized by the fact that firing thereof yields a thoroughly uniform product which externally resembles glass or a ceramic.

It will be noted in the foregoing paragraph that the examples cited as illustrative of recent developments in this art, have all been instances where the glaze material was essentially resistive in nature. It is, in fact, true that most of the recent developments in electroconductive glaze technology have been in the field of passive resistor elements, the inpetus for such work residing in the increasing applicability of such elements to integrated circuit technology. The same integrated circuit technology, however, has required that there be available in addition to resistive glazes, electroconductive glazes which are essentially conductive in nature, and which may, for such reason be employed to effect required connections between other elements in a given circuit design. It may in this connection be noted that electrically conductive glazes, somewhat unlike the case with the newer resistive materials, show a course of development in the electronics and related arts which goes back many years. Conductive compositions, for example, essentially including dispersions of silver in glass binders are shown in U.S. Pats. Nos. 2,451,158 and 2,530,217. However, much of this early art directed toward conductive glazes has not been of value in modern applications in that the critical requirements imposed on these materials where utilized in integrated circuits or the like cannot be met by the simple formulations of the prior art. In this connection, it may in particular be observed that in the integrated circuit environment to which these materials would find application, it is found that the adhesive strength exhibited by these glazes when in contact with other circuit materials—particularly with the alumina substrates common in integrated circuit technology—has been undesirably low. These poor strength characteristics are particularly evident where the circuits are present in an elevated temperature environment. In many instances, actual separation of components from the substrates has occurred, with highly detrimental and costly results. The low adhesive strength referred to is in fact just one aspect of a more general deficiency in these materials, viz a lack of mechanical strength therein.

Another important deficiency observed in many of the conductive glazes of the prior art has been the inacceptable resistance of such materials to aging. More specifically, we refer here to the fact that these prior glazes have tended to show—in the presence of solder—inacceptable loss of adhesive strength as a function of time.

Yet another problem that has been evident in the prior art, and particularly in the case of prior silver glazes, has been the inacceptable solder ability characteristics displayed by the majority of such materials.

In accordance with the foregoing, it may be regarded as an object of the present invention to provide a highly conductive glaze material exhibiting superior mechanical and electrical properties.

It is a further object of the invention to provide a conductive glaze material displaying greatly increased ability to adhere to substrate materials, and particularly to the high alumina content substrates which have come into increasing usage in the electronic arts.

It is another object of the invention to provide a conductive glaze material enabling superior line definition in printed conductive elements.

It is a yet further object of the invention to provide a conductive glaze of excellent solderability characteristics, and which is less costly than glazes of comparable utility in the prior art.

SUMMARY OF INVENTION

Now in accordance with the present invention, it has been found that the objects previously set forth can be achieved by utilizing a dispersion of cadmium and silver within a glass matrix which in the finished glaze product is at least partially devitrified. The product described will typically be prepared according to a firing schedule which assures that proper adhesion to the substrate environment, and proper devitrification, will be achieved.

DESCRIPTION OF THE PREFERRED EMBODIMENT

In accordance with the present invention, particles or flakes of silver and cadmium are dispersed in very fine form, in a binder glass which in the fired product is partially or largely devitrified. While any glass may be utilized with the invention which devitrifies at temperatures appropriate to firing of the paste dispersions prepared in accordance with the invention, it has been found preferable to incorporate into the paste, glasses comprising the type of material referred to as a "devitrifiable solder glass." The term "solder glass" per se generally refers to a low melting point glass composition used for joining materials and particularly for sealing glass to metals. These glasses are more particularly described in terms of functional characteristics, it usually being indicated that the glasses are characterized by a viscosity in the range of $10^4$ to $10^6$ poise at the sealing temperatures. In general, two types of solder glasses are recognized: the thermoplastic or stable type, and the thermosetting or devitrifying type. It is the latter type of materials—the devitrifying solder glass—that is preferably used in accordance with the present invention. Typically, these thermosetting or devitrifying glasses are formed from the system $PbO—B_2O_3—ZnO—SiO_2$, often with $Al_2O_3$ or CuO additions, or both; however other systems are known, as for example that based on the system $PbO—TiO_2—SiO_2$ Depending upon the specific composition of a given devitrifying solder glass, devitrification, that is to say, conversion to crystalline form, begins to occur at given temperatures. As is well-known in the art, a given devitrifying composition may be modified by inclusion of suitable ingredients so that the temperature of devitrification can be suitably adjusted. In the case of the $PbO—B_2O_3—ZnO—SiO_2$ systems previously cited, zinc oxide content, particularly in view of the particular amount of lead oxide present, is usually regarded as the key agent in controlling this aspect of devitrification.

In the practice of the present invention, the total metal content present in the fired glaze product typically lies in the range of 85 to 95%, with the preferable amount of metal content residing close to a figure of 90%. Of the total metal content cited, preferably 5 to 20% by weight will comprise cadimum, with the balance silver. In the general method of preparing pastes for firing in accord with the invention, cadmium and silver powder or flakes, typically in a size range substantially smaller than 200 mesh, are intermixed with the selected inorganic binder glass frit together with suitable organic vehicles such as ethyl cellulose and α-terpineol blended through rolling mills or the like. The resulting pastes are then, in a typical instance, screen printed onto substrates such as the alumina substrates usually employed in microcircuitry applications. After drying at temperatures of 110° C. or so, the printed substrates are then fired according to a schedule that is appropriate for the particular glass binder phase present.

The firing schedule utilized to produce the finished glaze products of the invention will be illustrated hereinbelow for specific exemplary instances. However, it may be noted for the present, and as illustrative of the general method of the invention, temperatures will be utilized during the firing process which are sufficient to achieve at least partial devitrification of the glass binder.

While we do not intend to be bound by any particular theory respecting the present invention, it may be indicated for general expository purposes that we hypothesize the excellent results achieved in accordance with the invention to occur by virtue of a sequence of events somewhat as follows: Initially, the firing of the paste is thought to liquefy the glass binder without yet achieving sufficient temperature levels in the glass to begin to effect devitrification. During this stage of this firing process, it is believed that the principal physical phenomena occurring is glass flow, which has the important effect of achieving bonding between the partially fired paste and the underlying substrate upon which said paste is deposited. Glass flow during this phase also acts to expose the discrete metallic particles which, in turn, enables solderability in the finished glaze.

As the temperature of the now molten glass rises the most important devitrifying process occurs. More specifically, the glass binder which is now present between the various metal particles and which furthermore is firmly bonded to the substrate, is itself rendered partially or largely crystalline in nature by exposure to prolonged heating conditions. Important strengthening in the adherent bond between glaze material and substrate occurs during this devitrification process. More generally, rigidity is introduced into the material, which rigidity up to this point in the process, has been absent. The lands, which are defined by the conductive connecting lines on the alumina substrate are, as a result of such devitrification, rendered rigid in structure, as a result of which further flow and loss of definition in such lands does not occur.

The high strength observed in the fired glazes are thought to result from the fact that the devitrified glass present as a matrix amid the metallic element of particles, acts as a rigid bar to prevent agglomeration between particles, and that as a result of such containment the surface area of the metals remains very high in comparison to that which would result were not the rigid devitrified matrix present. The presence of such high surface area is believed to contribute to the high strengths observed in the ultimate glaze product, the presumption being that such strength in part results from the high degree of metal-glass contact area remaining in the material.

The present invention is illustrated by way of examples in the following paragraphs:

Example I

A paste, intended for utilization in the present invention, was prepared by blending in an automatic mortar and pastle approximately 9 parts by weight cadmium and silver flake (silver to cadmium ratio being 90:10) with 1 part inorganic binder, together with quantities of the organic vehicles ethyl cellulose and α-terpineol. The cadmium utilized was in a fine particulate form displaying a particle size range of from about 1 to about 15 microns. The silver utilized displayed a similar particle size range. The inorganic binder utilized consisted of a combination of two commercially available Harshaw Chemical Company (Cleveland, Ohio) glasses, viz grades 2899 and 6084, the respective ratio in the glass mixture being 2899/6084=3.7/1. The Harshaw 2899 glass cited is known to exhibit devitrifying properties at the temperatures used in the firing of this example, and shows an approximate analysis of 76% PbO, 8% $B_2O_3$, 2% $SiO_2$, and 10% ZnO. The 6084 glass, on the other hand, is a conventional borosilicate glass, softening at temperatures below 500° C.; this latter glass exhibits no devitrifying properties, and is added to the glass admixture principally to augment long-term thermal stability in the resulting glaze product.

The resulting paste was passed through a small, three roll, Ross mill 30 times to effect a uniform dispersion, and was then screen printed onto alumina substrates. After drying at 110° C., a series of such prepared substrates were fired through a belt furnace with varying firing cycles ranging in time from 6 to 18 minutes, and with peak temperatures in the range of from about 570° to about 800° C.

X-ray and visual examination of samples prepared as cited confirmed the presence of devitrification following exposure to the firing temperatures. It was in fact confirmed by X-ray diffraction patterns that devitrification of the samples was occurring over an entire experimental firing range of 570° to 800° C.

Conductivities of samples prepared as indicated was excellent in all instances—all samples displaying resistances of less than 0.010 ohms/square. Solderability was also uniformly good. For purposes of testing adhesion to substrates, a screened pattern containing a ⅜ in. diameter circle was dip-soldered and ½ watt spade lead wires, 0.032 in. diameter, were attached across the pad by solder reflow. These leads were then bent at 90° to the pad at the pad edge, and pulled in a Hughes lead tester. Forces of the order of 10 to 20 pounds were necessary to peel the pad from the substrate, the higher figure being associated as a rule with the higher firing temperature of the range previously cited. In many instances the alumina substrate broke, or the lead itself broke or pulled out of the solder, without peeling from the substrate. In no instance did the solder peel off the conductor pad. It was also found that the recrystallized glaze samples held line definition during sustained exposure to elevated temperatures in a manner much superior to samples of uncrystallized glazes.

It may be noted further in connection with this evaluation of adhesion strengths that silver glaze compositions of the prior art, showed under similar conditions, peeling at forces usually well under 10 pounds—and in many cases at 5 pounds or less.

Example II

Compositions were prepared similar to those described in connection with Example I, except that a silver to cadmium ratio of 80:20 was present in the metal content of the mixture. Specimens were fired under conditions identical to those set forth in Example I. The resulting specimens exihibited approximately equivalent adhesions as were achieved with the Example I samples, but somewhat reduced conductivities and solderability was evidenced. Compositions were also prepared wherein the cadmium content ranged to 30 and 40% of the total metal content. Solderability characteristics of the products were quite poor, however, as the 30% level was attained, and were generally unacceptable at higher levels.

Example III

Compositions similar to that described in connection with Example I were prepared, except that portions of the glass binder were replaced by $\alpha$-$Bi_2O_3$. It was found that replacement to the extent of 30 to 35% of such glass by $\alpha$-$Bi_2O_3$, resulted in extending somewhat the range of firing temperatures over which good solderability could be achieved.

While the binder composition set forth in Example I has been described with the particularity required for this illustration, it should be understood that other thermosetting solder glasses may be utilized in the invention, either with or without the addition thereto of glasses not exhibiting devitrifying properties. Useful in this capacity for example, are Ferro glasses DP–687–A and DP–687–B, products of the Ferro Corporation of Cleveland, Ohio, which glasses are known to exhibit devitrifying properties even at 450° C.

More generally, it will become evident, in consideration of the present disclosure, that numerous modifications upon the invention may now be devisable by those skilled in the art, which modifications should yet be deemed within the teaching of the present inventions. Accordingly, the invention should be broadly construed, and limited only by the scope and spirit of the claims now appended hereto.

We claim:

1. A conductive glaze composition comprising a homogeneous dispersion of finely divided silver and cadmium in an at least partially devitrified solder glass matrix, said silver and cadmium together comprising between about 85% to about 95% by weight of said composition and said cadmium comprising between about 5 to about 30% by weight of said metals.

2. A composition according to claim 1 wherein said cadmium comprises between about 5 to about 20% by weight of said metals.

3. An electroconductive paste composition suitable for firing into a conductive glaze comprising a mixture of finely divided silver and cadmium together with a devitrifiable solder glass frit and temporary organic liquid binder, said silver and cadmium taken together comprising between about 85% to about 95% by weight of said solid components and said cadmium comprising between about 5 to about 30% by weight of said metals.

4. A composition according to claim 3 wherein said cadmium comprises between about 5 to about 20% by weight of said metals.

5. A composition according to claim 4 wherein said metals comprise approximately 90% by weight of said solid components and said cadmium comprises approximately 10% by weight of said metals.

6. A composition according to claim 5 wherein 0 to 45% of said glass frit is replaced by bismuth trioxide.

7. A method for preparing a conductive glaze composition exhibiting increased mechanical strength and solderability comprising (a) preparing a paste composition comprising a mixture of about 90% by weight finely divided silver and cadmium, about 10% by weight of a devitrifiable glass frit, together with temporary liquid binders, said silver and cadmium being present in the ratio range to one another from about 8:2 to about 9:1; and (b) firing said composition at temperatures sufficient to at least partially devitrify said glass.

References Cited

UNITED STATES PATENTS

| | | | |
|---|---|---|---|
| 2,170,431 | 8/1939 | Schwarzkopf | 252—514 |
| 3,080,328 | 3/1963 | Billian | 252—512 |
| 3,154,503 | 10/1964 | Janakirama-Rao et al. | 252—514 |

DOUGLAS J. DRUMMOND, Primary Examiner

U.S. Cl. X.R.

106—47; 117—227